US012722166B2

(12) United States Patent
Lee

(10) Patent No.: US 12,722,166 B2
(45) Date of Patent: Sep. 1, 2026

(54) NOZZLE ASSEMBLY AND SPRAY SYSTEM INCLUDING SAME

(71) Applicant: SEON SEON CO., LTD., Gimhae-si (KR)

(72) Inventor: Joo Hyung Lee, Asan-si (KR)

(73) Assignee: SEON SEON CO., LTD., Gimhae-si (KR)

( * ) Notice: Subject to any disclaimer, the term of this patent is extended or adjusted under 35 U.S.C. 154(b) by 242 days.

(21) Appl. No.: 18/037,841

(22) PCT Filed: Nov. 20, 2020

(86) PCT No.: PCT/KR2020/016513

§ 371 (c)(1),
(2) Date: May 19, 2023

(87) PCT Pub. No.: WO2022/107934

PCT Pub. Date: May 27, 2022

(65) Prior Publication Data

US 2024/0001381 A1 Jan. 4, 2024

(51) Int. Cl.

| | |
|---|---|
| ***B05B 7/10*** | (2006.01) |
| ***B05B 1/34*** | (2006.01) |
| ***B05B 7/06*** | (2006.01) |

(52) U.S. Cl.

CPC .............. *B05B 7/10* (2013.01); *B05B 1/3415* (2013.01); *B05B 1/3489* (2013.01); *B05B 7/064* (2013.01); *B05B 7/066* (2013.01)

(58) Field of Classification Search

CPC ..... B05B 1/3415; B05B 1/3489; B05B 7/064; B05B 7/066; B05B 7/10

See application file for complete search history.

(56) References Cited

U.S. PATENT DOCUMENTS 4,546,923 A * 10/1985 Li ......................... F23D 11/108 239/433
5,499,768 A * 3/1996 Tanaka ...................... B05B 7/10 239/405

(Continued)

FOREIGN PATENT DOCUMENTS

JP 07-127549 A 5/1995
JP 2007-185565 A 7/2007

(Continued)

OTHER PUBLICATIONS

Kamiyoshi (JP 2016-163034) (Year: 2016).*

(Continued)

*Primary Examiner* — Cody J Lieuwen
(74) *Attorney, Agent, or Firm* — Sughrue Mion, PLLC

(57) ABSTRACT

The present disclosure relates to a nozzle assembly and a spray system including the same. The nozzle assembly includes a base body having one end including an outlet through which a first fluid and a second fluid are discharged, and another end connected to a first supply line, one side of the base body being connected to a second supply line, and an inserter that is inserted into the base body, and has a guide groove arranged on a surface thereof, wherein, in the base body, a first pressure of the first fluid supplied through the first supply line is less than a second pressure of the second fluid supplied through the second supply line, and in the inserter, the first fluid moves to the outlet through an internal space, and the second fluid moves to the outlet along the guide groove.

9 Claims, 15 Drawing Sheets

(56) References Cited

U.S. PATENT DOCUMENTS

| | | | | |
|---|---|---|---|---|
| 2003/0136861 | A1* | 7/2003 | Kangas | B05B 7/10 239/422 |
| 2004/0240311 | A1* | 12/2004 | Hashiba | B01F 35/833 366/101 |
| 2009/0137214 | A1 | 5/2009 | Hofmann et al. | |
| 2009/0197214 | A1* | 8/2009 | Bretz | B05B 7/10 239/404 |

FOREIGN PATENT DOCUMENTS

| | | | |
|---|---|---|---|
| JP | 2016-163034 | A | 9/2016 |
| JP | 2020-165656 | A | 10/2020 |
| KR | 10-2018-0021445 | A | 3/2018 |
| KR | 10-1855211 | B1 | 5/2018 |

OTHER PUBLICATIONS

International Search Report of PCT/KR2020/016513 dated Aug. 19, 2021 [PCT/ISA/210].
Communication issued Dec. 19, 2023 in Korean Application No. 10-2023-0166966.

* cited by examiner

NOZZLE ASSEMBLY AND SPRAY SYSTEM INCLUDING SAME

CROSS REFERENCE TO RELATED APPLICATIONS

This application is a National Stage of International Application No. PCT/KR2020/016513 filed on Nov. 20, 2020.

TECHNICAL FIELD

The present disclosure relates to a nozzle assembly and a spray system.

BACKGROUND ART

In general, spray devices that spray a liquid such as water through a plurality of nozzles are widely used for the purpose of cultivating crops for the growth of plants, for the purpose of lowering the temperature of livestock houses such as poultry farms or pig houses, for the purpose of lowering the temperature of heat islands such as the outer walls of buildings or roads in summer, etc.

A spray device needs to be configured to supply water at a high pressure to a spray pipe in order to spray the water in the form of mist through a plurality of nozzles connected to the spray pipe. As the pressure of the water supplied to the spray pipe increases, the effect of atomizing the water increases. However, there is a limit to keeping water at a high pressure, and it is difficult to maintain the durability of parts with high-pressure water. In an embodiment, it is important to significantly atomize water to be sprayed, and thus, research and development on this is necessary.

DESCRIPTION OF EMBODIMENTS

Technical Problem

An objective of the present disclosure is to provide a nozzle assembly and a spray system capable of atomizing a fluid to be sprayed and performing internal cleaning. However, this objective is merely illustrative, and the scope of the present disclosure is not limited thereto.

Solution to Problem

One aspect of the present disclosure provides a nozzle assembly including a base body having one end including an outlet through which a first fluid and a second fluid are discharged, and another end connected to a first supply line, one side of the base body being connected to a second supply line, and an inserter that is inserted into the base body, and has a guide groove arranged on a surface thereof, wherein, in the base body, a first pressure of the first fluid supplied through the first supply line is less than a second pressure of the second fluid supplied through the second supply line, and in the inserter, the first fluid moves to the outlet through an internal space, and the second fluid moves to the outlet along the guide groove.

Advantageous Effects of Disclosure

A nozzle assembly and a spray system according to the present disclosure may atomize a fluid to be sprayed, into significantly small particles. When different fluids are introduced into the nozzle assembly and a first fluid is sprayed, a second fluid having a swirling force may collide with the first fluid to break apart the first fluid. In an embodiment, the second fluid having a swirling force guides the movement of the first fluid, such that the first fluid is sprayed over a wide area.

The nozzle assembly and the spray system according to the present disclosure may remove foreign substances therein. When the end of the nozzle assembly is blocked, the flow direction of the second fluid is changed, and thus, the second fluid moves in a direction opposite to the moving direction of the first fluid. The second fluid may remove foreign substances in the nozzle assembly and the spray system through a filter.

The nozzle assembly and the spray system according to the present disclosure may clean the inside thereof by changing the flow of the second fluid. By moving the second fluid to the first supply line through which the first fluid is supplied, the inside of the spray system may be cleaned.

In the nozzle assembly and the spray system according to the present disclosure, when the second fluid is sprayed at a high pressure, the first fluid is sprayed in a self-priming manner, and thus, the entire system may be compact, and may be installed in various locations.

BEST MODE

Figure 1:
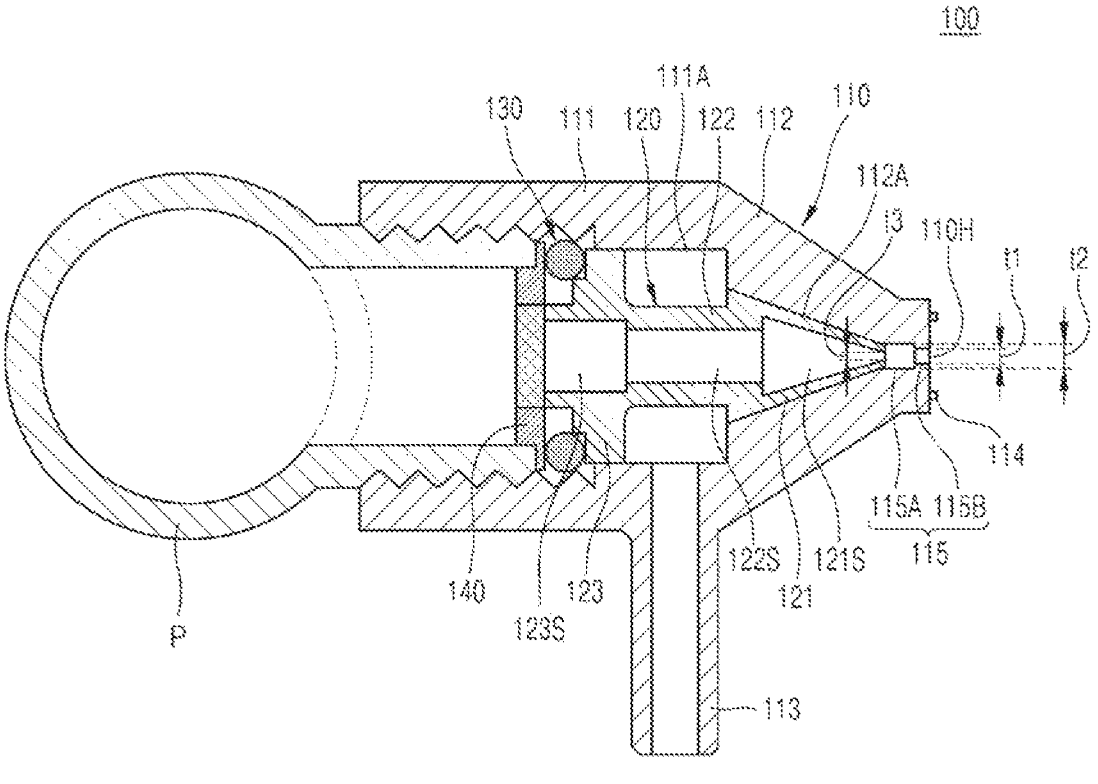
FIG. 1 is a diagram illustrating a nozzle assembly according to an embodiment of the present disclosure.

One aspect of the present disclosure provides a nozzle assembly including a base body having one end including an outlet through which a first fluid and a second fluid are discharged, and another end connected to a first supply line, one side of the base body being connected to a second supply line, and an inserter that is inserted into the base body, and has a guide groove arranged on a surface thereof, wherein, in the base body, a first pressure of the first fluid supplied through the first supply line is less than a second pressure of the second fluid supplied through the second supply line, and in the inserter, the first fluid moves to the outlet through an internal space, and the second fluid moves to the outlet along the guide groove.

In an embodiment, while the second fluid is discharged from the outlet, the flow of the first fluid may be increased.

In an embodiment, the inserter may include a head part having at least one guide groove arranged on a surface thereof, a shaft connected to the head part, and a flange connected to the shaft and extending in a radial direction.

In an embodiment, a plurality of guide grooves may be arranged to be spaced apart from each other along an inclined surface of the head part, and extension lines of the plurality of guide grooves may be arranged to be offset from each other.

In an embodiment, a plurality of guide grooves may be arranged on an inclined surface of the head part and tilted at a preset inclination, to form a swirl in the second fluid.

In an embodiment, the guide groove may have an inlet end through which the second fluid is introduced, and an outlet end through which the second fluid is discharged, and the cross-sectional area of the inlet end may be greater than the cross-sectional area of the outlet end.

In an embodiment, the cross-sectional area of the guide groove may decrease from the inlet end to the outlet end.

In an embodiment, the inserter may have a first opening through which the first fluid is discharged, and the cross-sectional area of the first opening may be less than the sum of cross-sectional areas of outlet ends of a plurality of guide grooves, and greater than a cross-sectional area of one of the outlet ends of the plurality of guide grooves.

Another aspect of the present disclosure provides a spray system including a storage tank in which a first fluid is stored, a first supply line connected to the storage tank, a pump arranged on the first supply line, a nozzle assembly connected to the first supply line, a second supply line that is connected to one side of the nozzle assembly and supplies a second fluid to the nozzle assembly, and a compressor arranged on the second supply line, wherein a first pressure of the first fluid supplied through the first supply line is less than a second pressure of the second fluid supplied through the second supply line, the nozzle assembly includes a base body connected to the first supply line and the second supply line and having an outlet through which the first fluid and the second fluid are discharged, and an inserter that is inserted into the base body, and has a guide groove arranged on a surface thereof, and in the inserter, the first fluid moves to the outlet through an internal space, and the second fluid moves to the outlet along the guide groove.

In an embodiment, the pump may be driven after the compressor is driven such that the second fluid is sprayed from the nozzle assembly and the first fluid is introduced into the pump from the storage tank.

Mode of Disclosure

As the present disclosure allows for various changes and numerous embodiments, particular embodiments will be illustrated in the drawings and described in detail. The effects and features of the present disclosure and methods of achieving them will become clear with reference to the embodiments described in detail below with the drawings. However, the present disclosure is not limited to the embodiments disclosed below, and may be implemented in various forms.

Hereinafter, embodiments of the present disclosure will be described in detail with reference to the accompanying drawings, and the same or corresponding components will be denoted by the same reference numerals when described with reference to the accompanying drawings, and thus, their descriptions that are already provided will be omitted.

In the following embodiments, terms such as “first,” “second,” etc., are used only to distinguish one component from another, and such components must not be limited by these terms.

In the following embodiments, the singular expression also includes the plural meaning as long as it is not inconsistent with the context.

In the following embodiments, the terms “comprises,” “includes,” “has”, and the like used herein specify the presence of stated features or components, but do not preclude the presence or addition of one or more other features or components.

In the following embodiments, when a layer, region, or component is referred to as being “on” another layer, region, or component, it may be directly or indirectly on the other layer, region, or component, that is, one or more intervening layers, regions, or components may be present therebetween.

For convenience of description, the magnitude of components in the drawings may be exaggerated or reduced. For example, each component in the drawings is illustrated to have an arbitrary size and thickness for ease of description, and thus the present disclosure is not limited to the drawings.

FIG. 1 is a diagram illustrating a nozzle assembly 100 according to an embodiment of the present disclosure.

Referring to FIG. 1, a first fluid F1 and a second fluid F2 may be introduced into the nozzle assembly 100 independently from each other, and the first fluid F1 and the second fluid F2 may be sprayed more finely while being mixed with each other at an outlet 115.

As illustrated in the drawing, the nozzle assembly 100 may be mounted on an external pipe P, to spray a fluid introduced from the pipe P. However, the present disclosure is not limited thereto, and the nozzle assembly 100 may be integrally formed with the pipe P.

In an embodiment, the first fluid F1 may be a liquid, and the second fluid F2 may be a gas. In the nozzle assembly 100, the second fluid F2 forms a vortex such that the first fluid F1 being sprayed may be more finely sprayed.

In another embodiment, both the first fluid F1 and the second fluid F2 may be liquids or gases. In the nozzle assembly 100, the second fluid F2 forms a vortex such that the first fluid F1 being sprayed may be more finely sprayed. In another embodiment, the first fluid F1 may be a gas, and the second fluid F2 may be a liquid.

The first fluid F1 and the second fluid F2 may be variously set according to the usage of the nozzle assembly 100. For example, when the nozzle assembly 100 is used to finely spray water, the first fluid F1 may be set as water, and the second fluid F2 may be set as air. As another example, when the nozzle assembly 100 is used to supply an agricultural chemical to plants in a greenhouse or the like, the first fluid F1 may be set as the agricultural chemical, and the second fluid F2 may be set as air.

A second pressure of the second fluid F2 being introduced into the nozzle assembly 100 may be set to be greater than a first pressure of the first fluid F1. The high-pressure second fluid F2 breaks the first fluid F1 into small pieces such that the first fluid F1 may be finely sprayed. In an embodiment, when the second fluid F2 is sprayed from the nozzle assembly 100, the first fluid F1 may flow due to the pressure difference. That is, because the outlet 115 of the nozzle assembly 100 is set to a relatively low pressure when the second fluid F2 is sprayed, the first fluid F1 may move to the outlet 115 due to the pressure difference.

The nozzle assembly 100 may include a base body 110, an inserter 120, and a sealing ring 130. In an embodiment, in an alternative embodiment, the nozzle assembly 100 may include a filter 140.

The base body 110 may be mounted on the pipe P, and the inserter 120, the sealing ring 130, and the filter 140 may be arranged in the internal space of the base body 110. The base body 110 may have a body 111, a nozzle end 112, a supply end 113, a protrusion 114, and the outlet 115.

The base body 110 may have an outlet 115 through which the first fluid F1 and the second fluid F2 are discharged, formed at one end thereof. The other end of the base body 110 may be connected to a first supply line L1, and one side of the base body 110 may be connected to a second supply line L2. The first fluid F1 may be introduced into the first supply line L1 and the second fluid F2 may be introduced into the second supply line L2.

One end of the body 111 may be connected to the pipe P, and the nozzle end 112 may extend to the other end of the body 111. A main space 111A may be formed inside the body 111. The body 111 and the pipe P may be coupled to each other in various manners. In an embodiment, the body 111 and the pipe P may be connected to each other by screw coupling.

The supply end 113 may be connected to the main space 111A, and the second fluid F2 may be introduced into the supply end 113. The main space 111A may be partitioned by a flange 123, the first fluid F1 may be introduced into the inserter 120 at the rear of the flange 123, the second fluid F2 may be introduced at the front of the flange 123, and the second fluid F2 may move to the nozzle end 112 and the outlet 115 along the outside of the inserter 120.

The nozzle end 112 may be connected to the body 111, and a head part 121 of the inserter 120 may be arranged inside the nozzle end 112. An inner surface 112A of the nozzle end 112 is in contact with the surface of the head part 121. The outlet 115 may be arranged at an end of the head part 121. The inner surface 112A of the nozzle end 112 and the surface of the head part 121 are in close contact with each other, such that the second fluid F2 cannot pass therethrough, but the second fluid F2 may move along a guide groove 120G arranged on the surface of the head part 121.

The supply end 113 may extend from one side of the base body 110 to be connected to the second supply line L2. One end of the supply end 113 is connected to the second supply line L2, and the other end of the supply end 113 is connected to the main space 111A. The second fluid F2 may be supplied into the base body 110 through the supply end 113.

The protrusion 114 may be arranged on an end of the nozzle end 112. The protrusion 114 may be arranged on an edge of the outlet 115. When cleaning the nozzle assembly 100, a user closes the end of the nozzle end 112 by putting the user's finger on the protrusion 114 and pressing the protrusion 114. Then, a second opening 110H of the nozzle end 112 may be completely blocked, and the second fluid F2 may be introduced into the inserter 120. This will be described in detail below.

The outlet 115 may be arranged at one end of the base body 110, and the first fluid F1 and the second fluid F2 may be discharged through the outlet 115. The outlet 115 may be arranged inside the nozzle end 112 to be located at the end of the nozzle end 112. The outlet 115 may have the second opening 110H, and the first fluid F1 and the second fluid F2 may be discharged through the second opening 110H.

In an embodiment, the outlet 115 may have a certain internal space. An end of the inserter 120 may be connected to the outlet 115, and the first fluid F1 and the second fluid F2 discharged from the inserter 120 may pass through the outlet 115 to be sprayed out of the nozzle assembly 100.

In an embodiment, the outlet 115 may have a first space 115A and a second space 115B. The first space 115A may be connected to a first opening 120H of the inserter 120, and the second space 115B may be connected to the second opening 110H of the base body 110.

The first space 115A may be formed to be larger than the second space 115B. The first space 115A may provides a certain space to the high-pressure second fluid F2 changed into a vortex, to guide the first fluid F1 to move forward, and break the first fluid F1 into finer particles. Because the volume of the second space 115B is less than that of the first space 115A, the first fluid F1 being sprayed may be sprayed more strongly.

In detail, a first width t1 of the first space 115A in the radial direction may be less than a second width t2 of the second space 115B. The first opening 120H of the inserter 120 may have a third width t3, and the third width t3 may be less than the first width t1 and the second width t2. The first fluid F1 discharged from the first opening 120H may pass through the first space 115A and the second space 115B, and at this time, the second fluid F2 may break the first fluid F1 into finer particles.

Because the outlet 115 provides a space for accommodating the first fluid F1 and the second fluid F2, the second fluid F2 may be introduced into the inserter 120 when cleaning the nozzle assembly 100. In cleaning the nozzle assembly 100, when the user closes the end of the nozzle end 112, the second opening 110H of the nozzle end 112 may be completely blocked, and the second fluid F2 moving along the guide groove 120G may be introduced into the first opening 120H and then into the inserter 120. This will be described in detail below.

In another embodiment, the outlet 115 may have a plurality of spaces. One space or three or more spaces may be provided between the first opening 120H and the second opening 110H.

Figure 2:
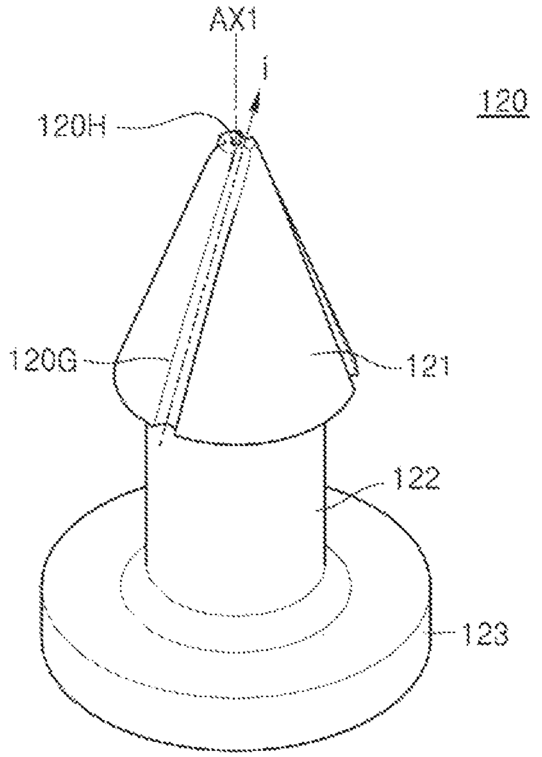
FIG. 2 is a perspective view illustrating an inserter of FIG. 1.
Figure 3:
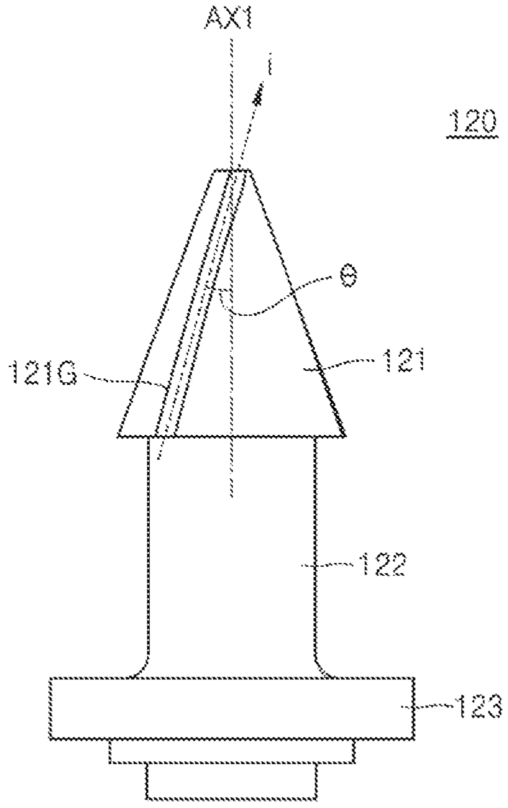
FIG. 3 is a front view of the inserter of FIG. 2.
Figure 4:
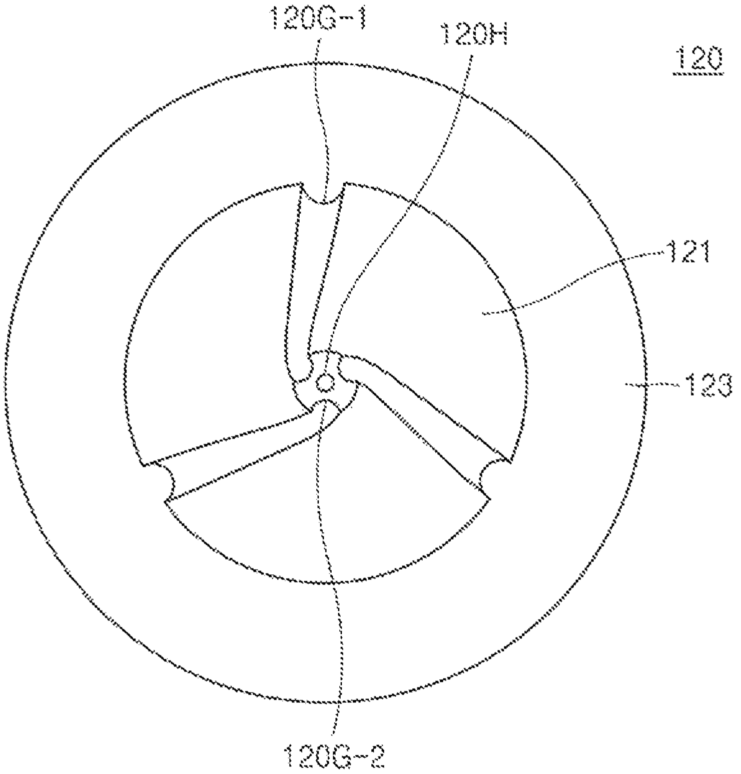
FIG. 4 is a plan view of the inserter of FIG. 2.

FIG. 2 is a perspective view illustrating the inserter 120 of FIG. 1, FIG. 3 is a front view of the inserter 120 of FIG. 2, and FIG. 4 is a plan view of the inserter 120 of FIG. 2.

Referring to FIGS. 1 to 4, the inserter 120 may be inserted into the base body 110, and may have the guide groove 120G arranged on the surface thereof.

The inserter 120 provides paths through which the first fluid F1 and the second fluid F2 respectively move. The first fluid F1 may be introduced into the inserter 120, and the second fluid F2 may move along the outer surface of the inserter 120. The inserter 120 may provide a path through which the first fluid F1 moves, and cause the second fluid F2 to swirl such that a vortex is formed in the second fluid F2.

In the inserter 120, the head part 121, a shaft 122, and the flange 123 may be arranged in the direction of a first axis AX1. In an embodiment, a first internal space 121S may be arranged inside the head part 121, a second internal space 122S may be arranged inside the shaft 122, a third internal space 123S may be arranged inside the flange 123, and the first internal space 121S, the second internal space 122S, and the third internal space 123S may be connected to each other in the direction of the first axis AX1.

The head part 121 is inserted into the nozzle end 112. The surface of the head part 121 may be in close contact with the inner surface 112A of the nozzle end 112, and thus, the moving path of the second fluid F2 may be set by the guide groove 120G.

The guide groove 120G may be arranged on the surface of the head part 121. A plurality of guide grooves 120G may be arranged to be spaced apart from each other along an inclined surface of the head part 121. The plurality of guide grooves 120G may be spaced apart from the center of the head part 121 at equal intervals.

In an embodiment, as illustrated in the drawings, the inserter 120 may have three guide grooves 120G arranged on the surface of the head part 121.

In another embodiment, although not illustrated in the drawings, the inserter may have two or more guide grooves arranged on the head part.

In another embodiment, although not illustrated in the drawings, the inserter may have one guide groove arranged on the surface of the head part, and the one guide groove may have a spiral shape along the head part.

The guide grooves 120G may be arranged such that their extension lines are offset from each other. The plurality of guide grooves 120G are arranged on the inclined surface of the head part 121 to be tilted at a preset inclination θ. The extension line of the guide groove 120G is not directed toward the first axis AX1, and extends in a tangential direction of the end of the head part 121. Because the second fluid F2 moving through each guide groove 120G is discharged in the tangential direction from the end of the head part 121, the flow of the second fluid F2 may have a swirl or a vortex.

In detail, the guide groove 120G extends in a direction i, and the extension line does not intersect the first axis AX1. In an embodiment, the extension lines of the guide grooves 120G are arranged not to intersect the first axis AX1. Because the guide groove 120G extends outside the first opening 120H, the first fluid F1 collides with the swirl of the second fluid F2 at the same time as being discharged from the first opening 120H.

Because the guide groove 120G is not parallel to the first axis AX1, the second fluid F2 discharged from the guide groove 120G may have a swirling force. The second fluid F2 moving in the direction i has a first flow rate in the direction of the first axis AX1, and a second flow rate in the tangential direction of the first opening 120H. The second fluid F2 moves forward by the first flow rate, and a swirling force is generated in the second fluid F2 by the second flow rate.

In an embodiment, the guide groove 120G may have an inlet end 120G-1 through which the second fluid F2 is introduced, and an outlet end 120G-2 through which the second fluid F2 is discharged. The inlet end 120G-1 is arranged at a lower portion of the head part 121, and the outlet end 120G-2 is arranged in a front portion of the head part 121 and outside the first opening 120H.

For example, in the guide groove 120G, the cross-sectional area of the inlet end 120G-1 may be greater than the cross-sectional area of the outlet end 120G-2. Because the cross-sectional area of the outlet end 120G-2 is greater than the cross-sectional area of the inlet end 120G-1, the discharge rate of the second fluid F2 may be increased to be greater than the introduction rate. The second fluid F2 may be discharged from the guide groove 120G at a high pressure, and may have a strong swirling force.

For example, the guide groove 120G may be formed such that its cross-sectional area decreases from the inlet end 120G-1 to the outlet end 120G-2. The cross-sectional area may linearly decrease from the inlet end 120G-1 to the outlet end 120G-2, and thus, the flow rate of the second fluid F2 may be increased while moving along the guide groove 120G. The second fluid F2 may be discharged from the guide groove 120G at a high pressure, and may have a strong swirling force.

The shaft 122 may be connected to the head part 121, and the first fluid F1 may pass in the shaft 122. Although the drawings illustrate that the shaft 122 has a substantially cylindrical shape, the shaft 122 is not limited thereto and may have various shapes such as a polygonal column.

The diameter of the shaft 122 is less than the diameter of the flange 123 and less than the diameter of the lower end of the head part 121. A space into which the second fluid F2 may be introduced may be formed on the outside of the shaft 122, and the space may communicate with the guide groove 120G of the head part 121 such that the second fluid F2 moves along the guide groove 120G.

The flange 123 may be connected to the shaft 122 and extend in the radial direction. The flange 123 may extend to the inner surface of the body 111 to partition the main space 111A of the body 111. Because the flange 123 partitions the main space 111A into a front portion and a rear portion, the first fluid F1 and the second fluid F2 may be prevented from being mixed with each other in the body 111.

Figure 5:
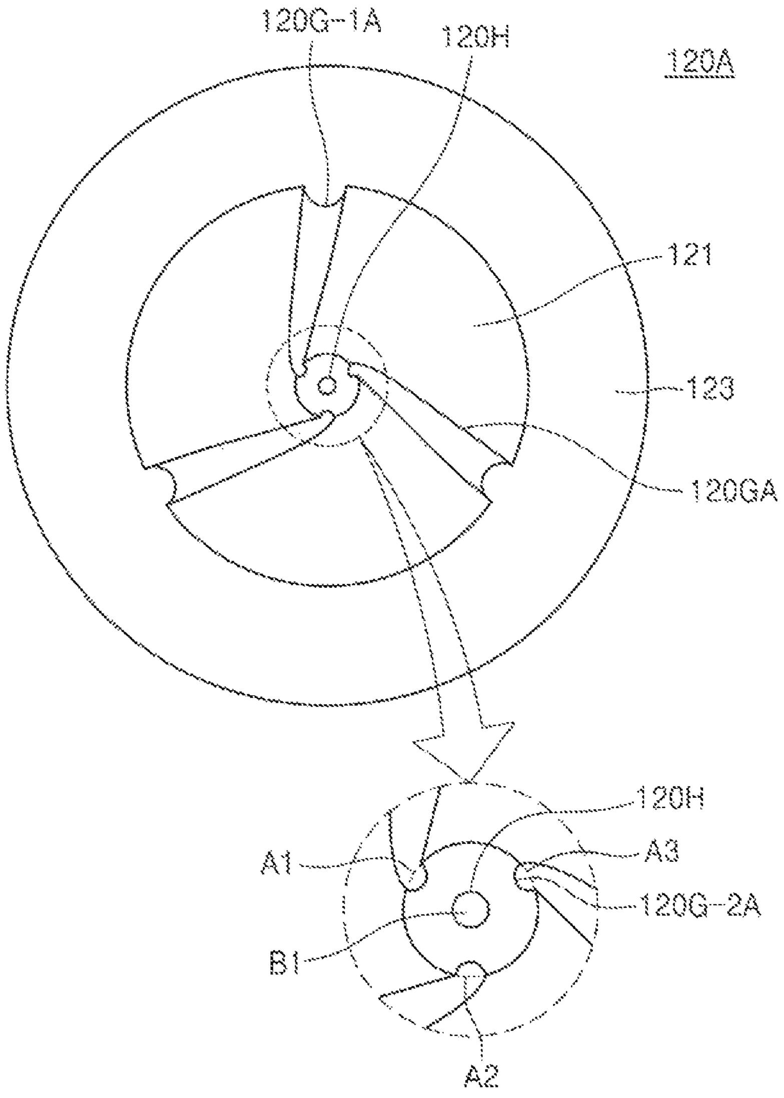
FIG. 5 is a diagram illustrating a modification of an inserter.

FIG. 5 is a diagram illustrating a modification of an inserter 120A.

Referring to FIG. 5, the inserter 120A may include the head part 121, the shaft 122, and the flange 123, and the cross-sectional area of an outlet end 120G-2A of a guide groove 120GA arranged on the head part 121 may be set to be small.

The guide groove 120GA may have an inlet end 120G-1A and the outlet end 120G-2A, and the cross-sectional area of the outlet end 120G-2A may be set to be less than the cross-sectional area of the inlet end 120G-1A.

In an embodiment, compared to the cross-sectional area of the first opening 120H, the cross-sectional area of the first opening 120H may be set to be greater than the cross-sectional area of one outlet end 120G-2A and less than the sum of the cross-sectional areas of a plurality of outlet ends 120G-2A.

Because a cross-sectional area A1, A2, or A3 of one outlet end 120G-2A is less than a cross-sectional area B1 of the first opening 120H, the second fluid F2 discharged from each outlet end 120G-2A may have a high pressure. The second fluid F2 discharged from the outlet end 120G-2A may be discharged at a high pressure to form a strong swirl, and the first fluid F1 colliding with the second fluid F2 may be finely sprayed.

Because the sum (A1+A2+A3) of the cross-sectional areas of the plurality of outlet ends 120G-2A is greater than the cross-sectional area B1 of the first opening 120H, the second fluid F2 may be discharged through the outlet ends 120G-2A at a sufficient flow rate. Because the second fluid F2 discharged from the outlet end 120G-2A is discharged at a sufficient flow rate, the first fluid F1 may be finely sprayed.

Figure 6:
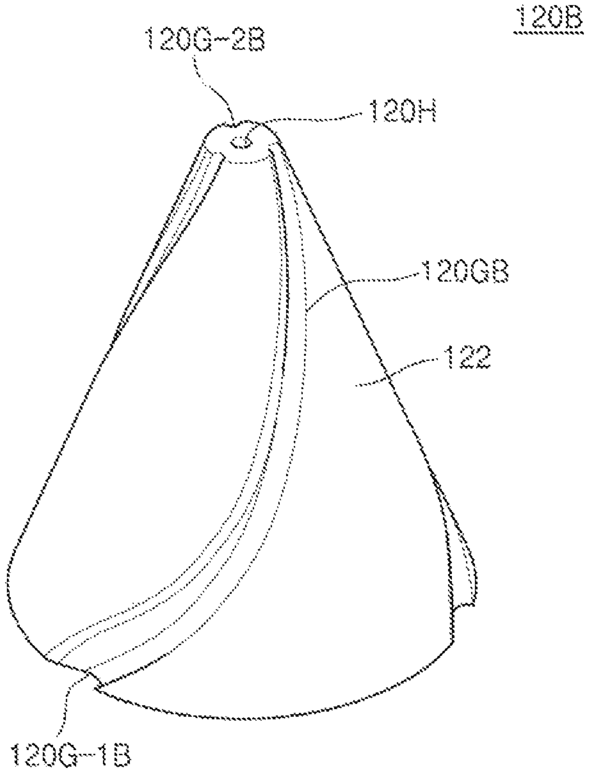
FIG. 6 is a diagram illustrating another modification of an inserter.

FIG. 6 is a diagram illustrating another modification of an inserter.

Referring to FIG. 6, an inserter 120B may have a spiral guide groove 120GB. A plurality of guide grooves 120GB may be arranged on the surface of the head part 121. The guide groove 120GB may have a spiral shape along the surface of the head part 121.

The guide groove 120GB has an inlet end 120G-1B and an outlet end 120G-2B, and has a spiral shape from the inlet end 120G-1B to the outlet end 120G-2B, and thus, the second fluid F2 moving along the guide groove 120GB may have a strong swirling force. The second fluid F2 discharged from the outlet end 120G-2B may have a strong swirling force, and the second fluid F2 may strongly break apart the first fluid F1 such that the first fluid F1 is finely sprayed.

Referring back to FIG. 1, the sealing ring 130 may be arranged inside the base body 110 and at the rear end of the inserter 120. The sealing ring 130 may seal a gap between the inserter 120 and the base body 110.

The filter 140 may be arranged between the inserter 120 and the pipe P to filter out foreign substances remaining in the first fluid F1. The filter 140 may remove the foreign substances included in the first fluid F1 before the first fluid F1 is introduced into the inserter 120.

Because the cross-sectional area of the first opening 120H of the inserter 120 is significantly small, the first opening 120H may be blocked by the foreign substances of the first fluid F1. The filter 140 may remove the foreign substances remaining in the first fluid F1 such that the first fluid F1 is sprayed without blockage.

Figure 7:
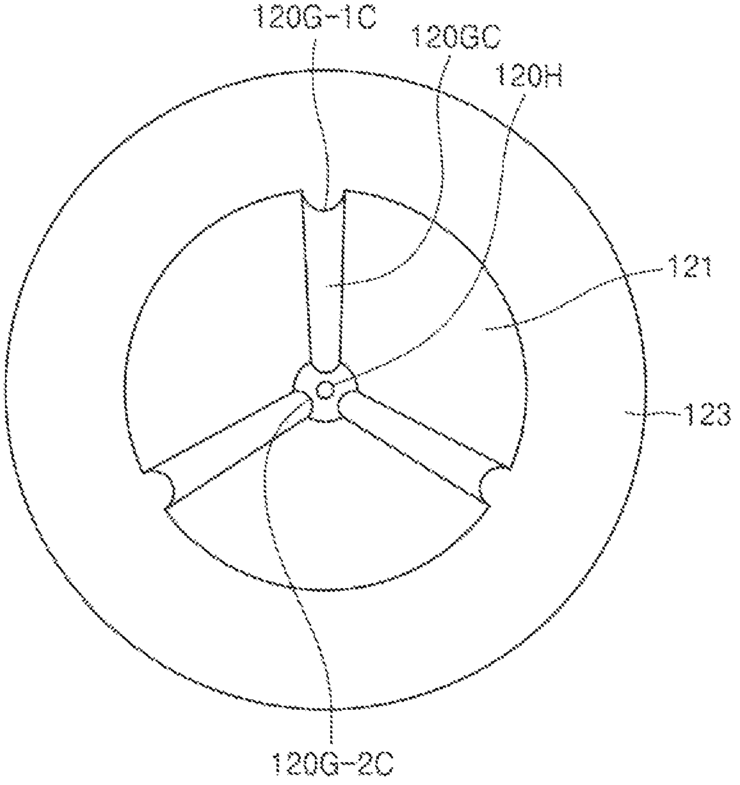
FIG. 7 is a diagram illustrating another modification of an inserter.

FIG. 7 is a diagram illustrating another modification of an inserter.

Referring to FIG. 7, an inserter 120C may have a straight guide groove 120GC. One or more guide grooves 120GC may be arranged on the surface of the head part 121.

The guide groove 120GC may extend in the direction of the first axis AX1 of the inserter 120C. The guide groove 120GC has an inlet end 120G-1C and an outlet end 120G-2C, and may extend toward the first opening 120H. Because the second fluid F2 moving along the guide groove 120GC is discharged through the first opening 120H of the inserter 120C, the second fluid F2 may be concentrated in the direction of the first axis AX1.

In an embodiment, in the guide groove 120GC, the cross-sectional area of the outlet end 120G-2C may be set to be less than the cross-sectional area of the inlet end 120G-1C.

In an embodiment, compared to the cross-sectional area of the first opening 120H, the cross-sectional area of the first opening 120H may be set to be greater than the cross-sectional area of one outlet end 120G-2C and less than the sum of the cross-sectional areas of a plurality of outlet ends 120G-2C.

Because the sum of the cross-sectional areas of the plurality of outlet ends 120G-2C is greater than the cross-sectional area of the first opening 120H, the second fluid F2 may be discharged through the outlet ends 120G-2C at a sufficient flow rate. Because the second fluid F2 discharged from the outlet end 120G-2C is discharged at a sufficient flow rate, the first fluid F1 may be finely sprayed.

Figure 8:
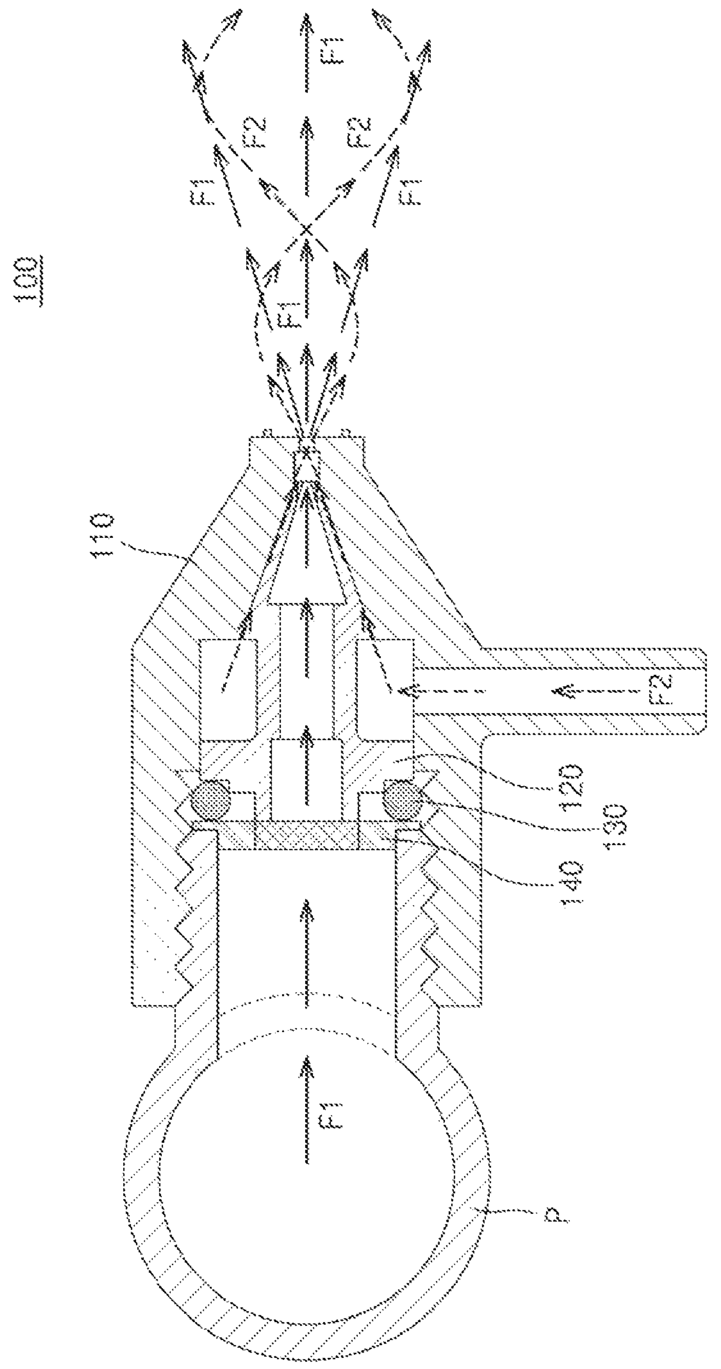
FIG. 8 is a diagram illustrating an operation, performed by the nozzle assembly of FIG. 1, of spraying a fluid.

FIG. 8 is a diagram illustrating an operation, performed by the nozzle assembly 100 of FIG. 1, of spraying a fluid.

Referring to FIG. 8, in the nozzle assembly 100, the second fluid F2 having a swirling force may break the first fluid F1 into small pieces such that the first fluid F1 is finely sprayed.

The first fluid F1 moving along the first supply line L1 passes through the pipe P to be introduced into the nozzle assembly 100. The first fluid F1 from which foreign substances are removed by the filter 140 moves in the direction of the first axis AX1, then passes through the internal space of the inserter 120, and moves to the outlet 115 of the base body 110.

The second fluid F2 moving along the second supply line L2 is introduced into the nozzle assembly 100 through the supply end 113. The second fluid F2 introduced into the main space 111A of the base body 110 moves along the guide groove 120G and moves to the outlet 115 of the base body 110. In the outlet of the base body 110, the first fluid F1 and the second fluid F2 are mixed with each other.

The second fluid F2 moving along the guide groove 120G may have a swirling force. The extension lines of the guide grooves 120G are arranged to be offset from each other, and spray the second fluid F2 in a tangential direction from the end of the head part 121. The second fluid F2 sprayed in the tangential direction of the head part 121 obtains a swirling force, and thus, the flow of the second fluid F2 is changed into a vortex.

The first fluid F1 may be finely sprayed by the swirling force of the second fluid F2. When the first fluid F1 and the second fluid F2 are gathered at the outlet 115, the swirling force of the second fluid F2 breaks the first fluid F1 into fine particles. The strong swirling force of the second fluid F2 may break the first fluid F1 into fine particles, and the first fluid F1 may be sprayed significantly finely.

At the same time, when the first fluid F1 and the second fluid F2 pass through the outlet 115, the swirling force of the second fluid F2 may expand the spray area such that the first fluid F1 is sprayed over a large area. Because the second fluid F2 has the swirling force extending in the radial direction, the first fluid F1 passing through the second opening 110H may form a wide spray area along the flow of the second fluid F2.

The first fluid F1 may be finely sprayed by a relatively high pressure of the second fluid F2. A first pressure of the first fluid F1 supplied to the nozzle assembly 100 may be set to be less than a second pressure of the second fluid F2. Because the second pressure is greater than the first pressure, the second fluid F2 may finely atomize the first fluid F1.

Because the second pressure of the second fluid F2 is greater than the first pressure of the first fluid F1, when the second fluid F2 is sprayed, the first fluid F1 may automatically sprayed from the nozzle assembly 100. When the high-pressure second fluid F2 is sprayed, the first fluid F1 may be introduced into the nozzle assembly 100 due to the pressure difference and function as priming water. That is, even before a pump is driven, the first fluid F1 may fill the inside of the pump while moving. Thereafter, when the pump is driven in a state in which the first fluid F1 is filled inside the pump, the pump may operate normally.

Figure 9:
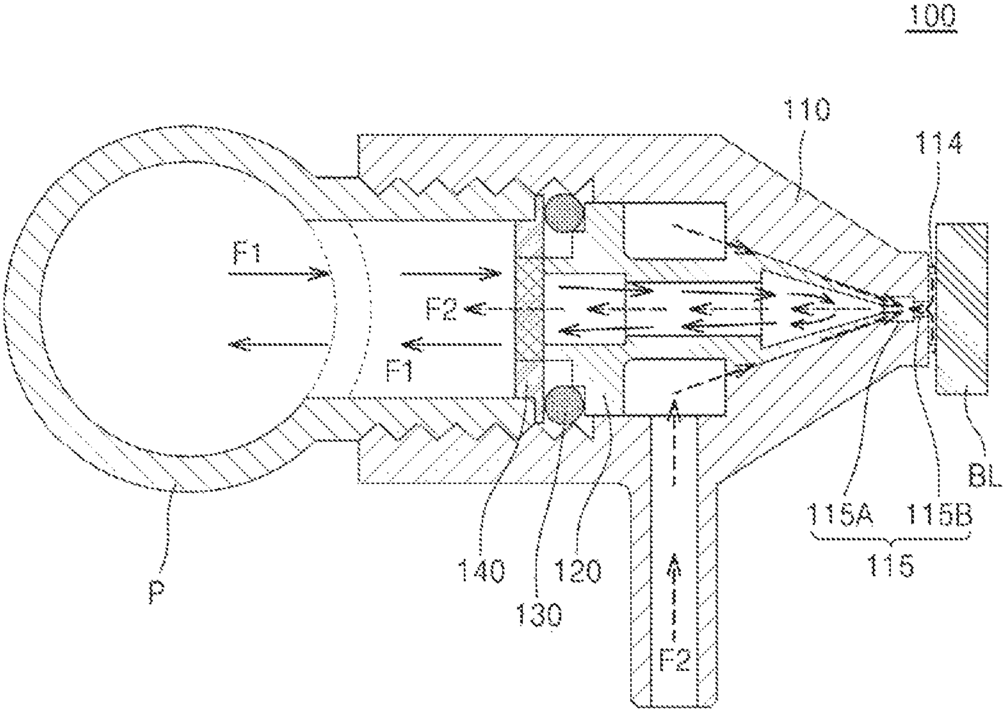
FIG. 9 is a diagram illustrating a cleaning operation of the nozzle assembly of FIG. 1.

FIG. 9 is a diagram illustrating a cleaning operation of the nozzle assembly 100 of FIG. 1.

Referring to FIG. 9, when the outlet of the nozzle assembly 100 is closed, the second fluid F2 may clean the nozzle assembly 100.

Because the path through which the first fluid F1 or the second fluid F2 moves has a significantly small cross section, the nozzle assembly 100 may be easily blocked by foreign substances. The nozzle assembly 100 according to the present disclosure may clean the inside of the nozzle assembly 100 simply and quickly.

The user may change the moving path of the second fluid F2 by blocking the outlet 115 of the nozzle assembly 100. The user may block the end of the nozzle assembly 100 by using a sealing member BL such that the first fluid F1 and the second fluid F2 do not discharge to the outside and move back to the internal space of the inserter 120.

The sealing member BL may be various parts capable of closing the outlet end of the nozzle assembly 100.

For example, the sealing member BL may be a part that blocks the outlet end of the nozzle assembly 100. The sealing member BL may be formed of a material having a certain cushion on a surface in contact with the protrusion 114, and when the sealing member BL presses the protrusion 114, the outlet end of the nozzle assembly 100 may be completely closed.

As another example, the user's finger may be used as the sealing member BL. When the user strongly presses the protrusion 114 with a finger, the user's finger having a certain cushion may completely seal the outlet end of the nozzle assembly 100.

The protrusion 114 may notify the user of an area where the outlet end of the nozzle assembly 100 is closed. The user may recognize a portion of the nozzle assembly 100 to be closed, based on the tactility of the protrusion 114. In an embodiment, the protrusion 114 may come into close contact with the sealing member BL having the cushion, such that the nozzle assembly 100 is completely sealed.

The internal space of the outlet 115 may provide a space in which the directions of the first fluid F1 and the second fluid F2 are changed. The moving direction of the first fluid F1 and the second fluid F2 colliding with the sealing member BL is changed, such that the first fluid F1 and the second fluid F2 move backward. In the first space 115A and the second space 115B of the outlet 115, the moving directions of the first fluid F1 and the second fluid F2 are reversed. In particular, the direction of the high-pressure second fluid F2 may be sufficiently changed in the internal space of the outlet 115 such that the second fluid F2 moves backward.

Foreign substances attached to the first opening 120H or the guide groove 120G may be removed by the backward movement. Because the opening area of the first opening 120H is large, the first fluid F1 and the second fluid F2 are introduced into the first opening 120H. The first fluid F1 and the second fluid F2 move along the inside of the inserter 120 and pass through the filter 140. At this time, foreign substances attached to the filter 140 may be removed by moving them to the pipe P.

Even in the cleaning operation, the second fluid F2 moves with a swirling force, such that the cleaning effect is improved. In detail, because the second fluid F2, the direction of which has been changed due to the sealing member BL, still has a swirling force, the second fluid F2 breaks the first fluid F1 into fine particles while moving inside the inserter 120. Therefore, the first fluid F1 and the second fluid F2 may effectively clean the nozzle assembly 100 while moving in the internal space of the inserter 120.

The second fluid F2 may clean the nozzle assembly 100 with a high pressure. In particular, because the second fluid F2 introduced into the inserter 120 has a higher pressure than that of the first fluid F1, when the second fluid F2 is introduced into the inserter 120, the direction of the first fluid F1 is also changed according to the second fluid F2. When the direction of the high-pressure second fluid F2 is changed, the direction of the first fluid F1 is also changed to effectively clean the internal space of the nozzle assembly 100.

Figure 10:
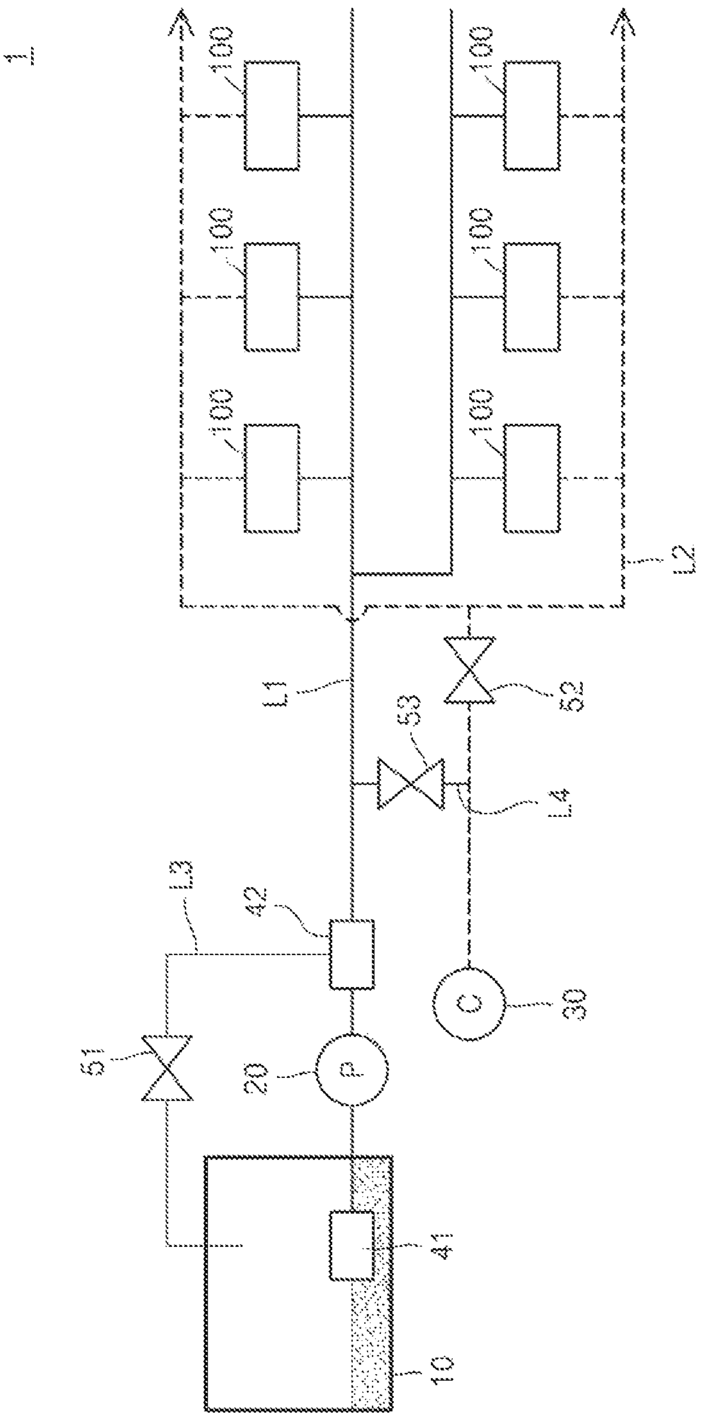
FIG. 10 is a diagram illustrating a spray system according to another embodiment of the present disclosure.

FIG. 10 is a diagram illustrating a spray system 1 according to another embodiment of the present disclosure.

Referring to FIG. 10, the spray system 1 may have a storage tank 10, a pump 20, a compressor 30, a first filter 41, a second filter 42, a plurality of valves, the nozzle assembly 100, the first supply line L1, the second supply line L2, a first sub-line L3, and a second sub-line L4.

The storage tank 10 stores the first fluid F1 and is connected to the first supply line L1. The first fluid F1 moving along the first supply line L1 may be discharged through the nozzle assembly 100.

The pump 20 is arranged on the first supply line L1. The pump 20 may suck the first fluid F1 in the storage tank 10 and supply the first fluid F1 to the nozzle assembly 100. The pump 20 may pressurize the first fluid F1 to a preset pressure, such that the first fluid F1 supplied to the nozzle assembly 100 has a first pressure.

In an embodiment, the pump 20 may be a low-pressure pump having an impeller to allow the first fluid F1 to flow freely in the suction and discharge directions.

Because the front and rear sides of the pump 20 are open in the moving direction of the first fluid F1, the first fluid F1 may flow backward into the storage tank 10 in a cleaning operation. The first fluid F1 moving into the storage tank 10 may clean the first filter 41.

The compressor 30 is arranged on the second supply line L2. The compressor 30 may compress the second fluid F2 and supply the second fluid F2 having a high pressure to the nozzle assembly 100 through the second supply line L2. The compressor 30 may pressurize the second fluid F2 to a preset pressure, such that the second fluid F2 supplied to the nozzle assembly 100 has a second pressure higher than the first pressure.

The first filter 41 may be mounted on the storage tank 10 and may primarily filter the first fluid F1 to be introduced into the first supply line L1.

The second filter 42 may be arranged between the pump 20 and the nozzle assembly 100, and may secondarily filter the first fluid F1 having passed through the pump 20. The second filter 42 may optionally be installed.

A first valve 51 may be arranged in the first sub-line L3 and may function as a relief valve. The first valve 51 may recover part of the first fluid F1 to maintain the pressure of the supplied first fluid F1 at a preset level.

A second valve 52 may be arranged on the second supply line L2, and may supply the second fluid F2 to the nozzle assembly 100 when opened, and supply the second fluid F2 to the first supply line L1 when closed.

A third valve 53 is arranged on the second sub-line L4 connecting between the first supply line L1 and the second supply line L2. When the third valve 53 is opened, the second fluid F2 may move to the first supply line L1.

The first supply line L1 may be connected to the storage tank 10, and may supply the first fluid F1 to the nozzle assembly 100. The second supply line L2 may be connected to the compressor 30, and may supply the second fluid F2 to the nozzle assembly 100.

The first sub-line L3 may be branched from the first supply line L1, and may recover the first fluid F1 to the storage tank 10. The second sub-line L4 may connect the first supply line L1 to the second supply line L2, and may be opened when the spray system 1 is cleaned.

<Spray Mode>

When the compressor 30 is driven, the high-pressure second fluid F2 moves along the second supply line L2 and is discharged to the nozzle assembly 100. At this time, the second valve 52 is opened, and the third valve 53 is closed.

When the second fluid F2 is discharged to the nozzle assembly 100, the first fluid F1 is automatically sucked into the pump 20. When the high-pressure second fluid F2 is discharged to the nozzle assembly 100, the first fluid F1 moves to the first filter 41 and the pump 20 due to the pressure difference. That is, the first fluid F1 may be introduced into the pump 20 to function as priming water.

When the first fluid F1 is filled in the pump 20, the pump 20 starts driving. The pump 20 pressurizes the first fluid F1 to a preset pressure, and the pressurized first fluid F1 is introduced into the nozzle assembly 100 through the second filter 42.

The degree to which the first fluid F1 is sprayed from the nozzle assembly 100 may be adjusted by adjusting the opening degree of the first valve 51. In an embodiment, the first fluid F1 collected through the first valve 51 may recover foreign substances remaining in the second filter 42 to the storage tank 10.

The first fluid F1 and the second fluid F2 respectively introduced into the nozzle assembly 100 are discharged through the outlet 115. The second fluid F2 has a swirling force, and thus may break the first fluid F1 into fine particles, and the first fluid F1 may be finely sprayed.

<Cleaning Mode>

In a cleaning mode, the spray system 1 may be cleaned while recovering the first fluid F1 by changing the moving path of the second fluid F2.

When the second valve 52 is closed and the third valve 53 is opened, the second fluid F2 having passed through the compressor 30 passes through the second sub-line L4 and is introduced into the first supply line L1. The second fluid F2 introduced into the first supply line moves through the second filter 42, the pump 20, and the first filter 41, and then is introduced into the storage tank 10. In an embodiment, the second fluid F2 may move through the first sub-line L3 to clean the first valve 51.

The second fluid F2 may remove foreign substances remaining in the first filter 41 and the second filter 42 while moving toward the first supply line L1 through the first supply line L1. As the first fluid F1 moves from the storage tank 10 to the nozzle assembly 100, foreign substances included in the first fluid F1 remain in the filters of the first filter 41 and the second filter 42. In a cleaning operation, the second fluid F2 moves in the opposite direction to the first fluid F1, and simultaneously moves the first fluid F1 in the opposite direction. Accordingly, foreign substances remaining in the first filter 41 and/or the second filter 42 may be removed.

The second fluid F2 may recover all of the first fluid F1 remaining in the first supply line L1. Even after the spray mode is terminated, part of the first fluid F1 remains in the first supply line L1. In the cleaning operation, the second fluid F2 guides the movement of the first fluid F1, and thus, all of the first fluid F1 may be removed from the first supply line L1. Because the first fluid F1 does not remain in the first supply line L1, freezing and bursting by the first fluid F1, corrosion of the pump 20 by the first fluid F1, and the like may be prevented.

When the cleaning mode is performed before the spray mode, the first fluid F1 may be mixed and stirred. When the second fluid F2 moves backward, the high-pressure second fluid F2 is injected into the storage tank 10. Because the second fluid F2 is strongly injected to the first fluid F1 stored in the storage tank 10, a medicine in the storage tank may be automatically mixed and stirred with the first fluid F1.

FIGS. 11 to 14 are diagrams illustrating other embodiments of the spray system of FIG. 10.

Figure 11:
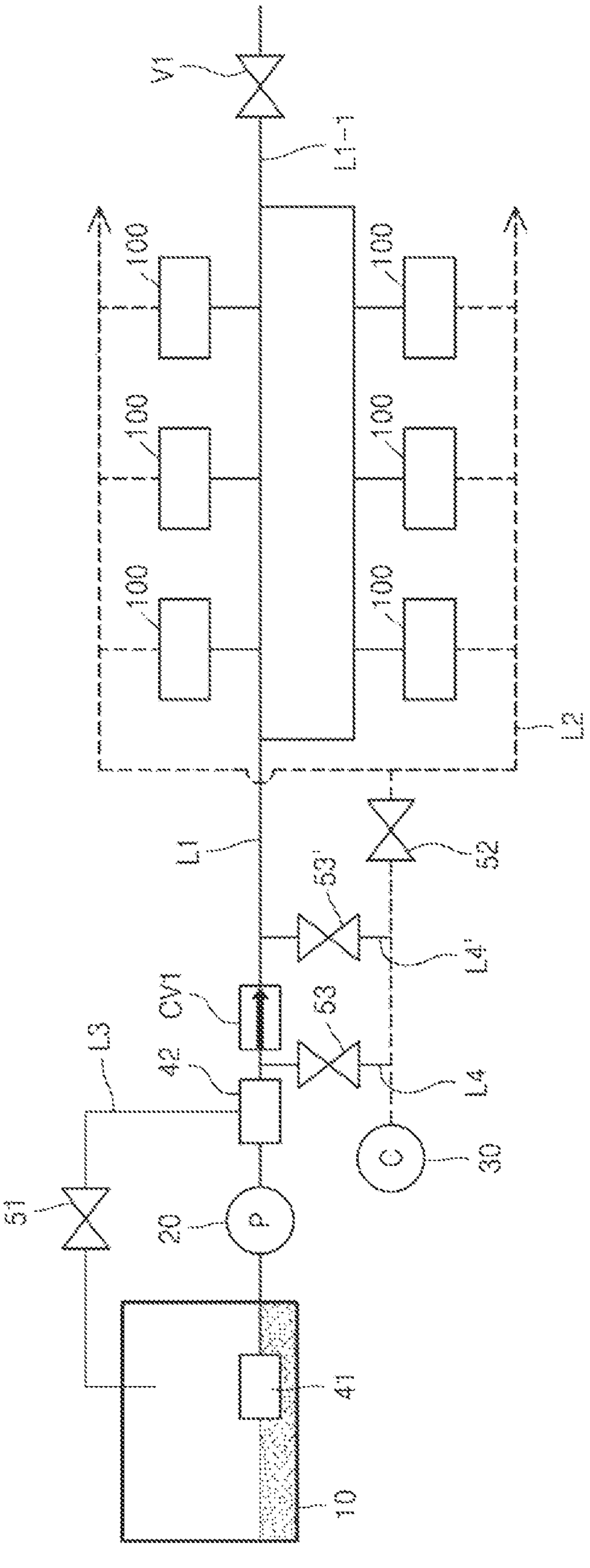
FIGS. 11 to 14 are diagrams illustrating other embodiments of the spray system of FIG. 10.

Referring to FIG. 11, a spray system 2 may have the storage tank 10, the pump the compressor 30, the first filter 41, the second filter 42, a plurality of valves, the nozzle assembly 100, the first supply line L1, the second supply line L2, the first sub-line L3, the second sub-line L4, a first check valve CV1, and a first valve unit V1.

After being branched according to the arrangement of the nozzle assembly 100, the first supply line L1 joins a first joining line L1-1. The first valve unit V1 is arranged on the first joining line L1-1.

The first check valve CV1 is arranged between the second sub-line L4 and the nozzle assembly 100. The first check valve CV1 may direct the first fluid F1 to move from the second filter 42 to the nozzle assembly 100.

A second sub-line L4' is arranged between the first supply line L1 and the second supply line L2, and is arranged in parallel to the second sub-line L4. The second sub-line L4' has one end arranged between the first check valve CV1 and the nozzle assembly 100, and the other end arranged between the second sub-line L4 and the second valve 52.

In a cleaning operation, the spray system 2 may discharge the first fluid F1 remaining in the spray system 2 by moving the second fluid F2 to the first supply line L1.

When the third valve 53 is opened and the second valve 52 is closed, the second fluid F2 moves along the second sub-line L4 to the first supply line L1. By the first check valve CV1, the second fluid F2 moves to the storage tank 10 through the second filter 42, the pump 20, and the first filter 41. At this time, the second fluid F2 may remove foreign substances remaining in the first filter 41 and the second filter 42.

When a third valve 53' is opened and the second valve 52 is closed, the second fluid F2 moves along the second sub-line L4' to the first supply line L1. By the first check valve CV1, the second fluid F2 moves toward the nozzle assembly 100, and the first fluid F1 remaining in the first supply line L1 and the nozzle assembly 100 moves to the first joining line L1-1. When the first valve unit V1 is opened, the first fluid F1 remaining in the first supply line L1 and the nozzle assembly 100 is discharged to the outside.

Figure 12:
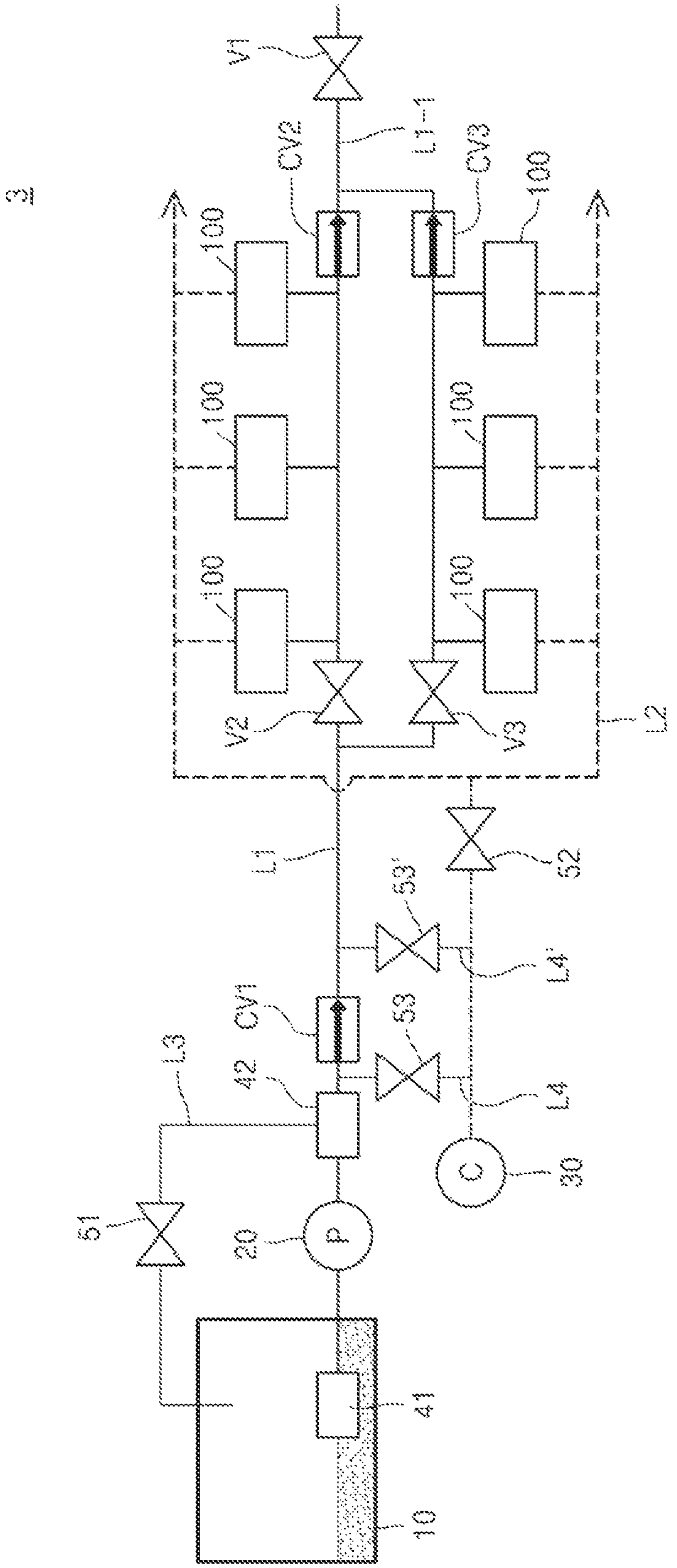

Referring to FIG. 12, a spray system 3 may have the storage tank 10, the pump the compressor 30, the first filter 41, the second filter 42, a plurality of valves, the nozzle assembly 100, the first supply line L1, the second supply line L2, the first sub-line L3, the second sub-line L4, the first check valve CV1, a second check valve CV2, a third check valve CV3, the first valve unit V1, a second valve unit V2, and a third valve unit V3.

In the spray system 3, a plurality of nozzle assemblies 100 may be arranged in parallel along the first supply line L1, and the second valve unit V2 and the third valve unit V3 may be arranged at each end. In an embodiment, the second check valve CV2 and the third check valve CV3 are arranged at each end. The first supply line L1 may form the first joining line L1-1 after the second check valve CV2 and the third check valve CV3.

The spray system 3 may independently control each line of the first supply line L1 to clean each line. When only the second valve unit V2 is opened, the first fluid F1 and the second fluid F2 may pass through the second check valve CV2 to be discharged to the first valve unit V1. When only the third valve unit V3 is opened, the first fluid F1 and the second fluid F2 may pass through the third check valve CV3 to be discharged to the first valve unit V1.

The spray system 3 may control, independently for each line, the nozzle assemblies 100 arranged in a plurality of lines, and clean the nozzle assemblies 100 for each line.

Figure 13:
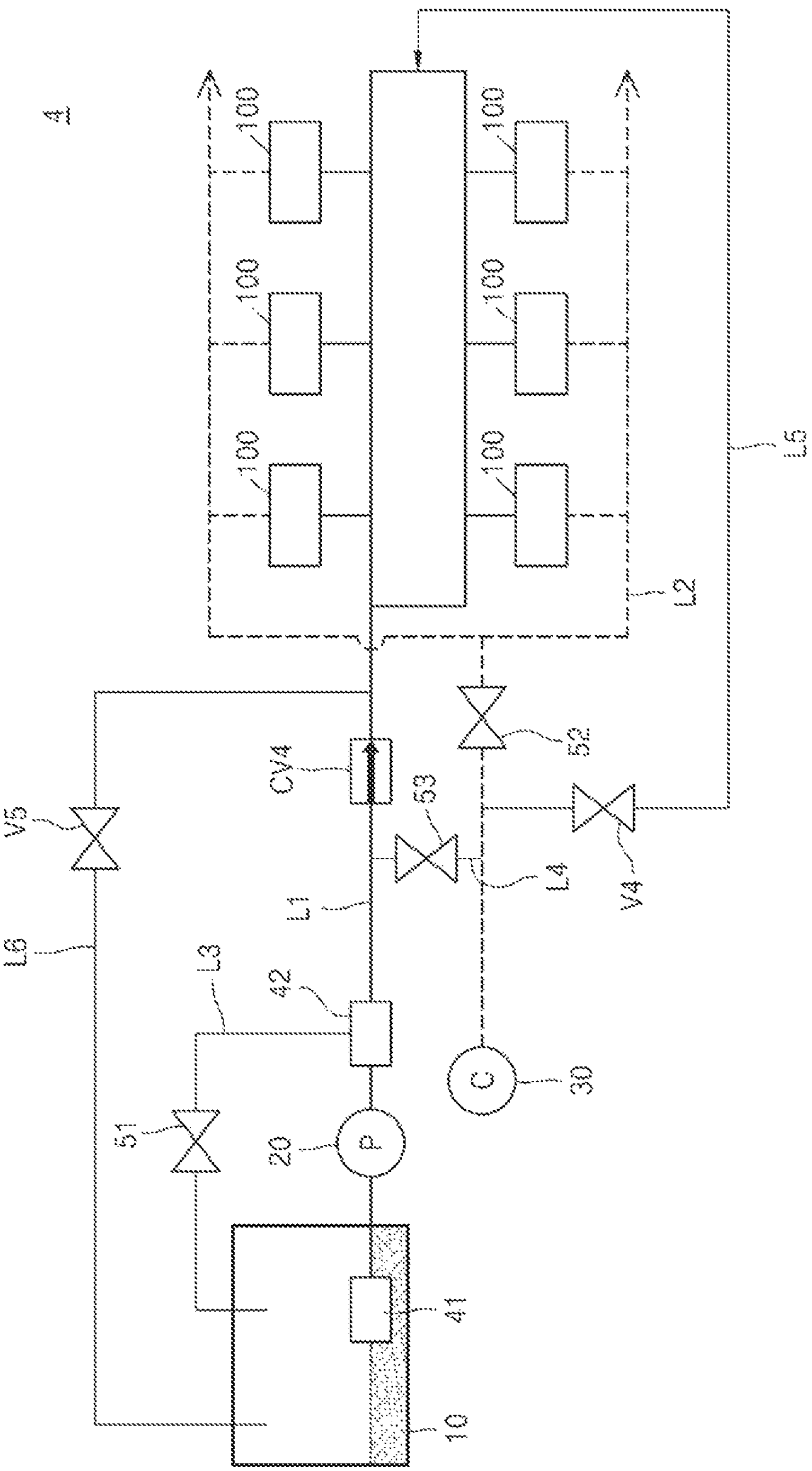

Referring to FIG. 13, a spray system 4 may have the storage tank 10, the pump the compressor 30, the first filter 41, the second filter 42, a plurality of valves, the nozzle assembly 100, the first supply line L1, the second supply line L2, the first sub-line L3, the second sub-line L4, a third sub-line L5, a fourth sub-line L6, a fourth check valve CV4, a fourth valve unit V4, and a fifth valve unit V5.

The first supply line L1 may branch into a plurality of lines according to a plurality of nozzle assemblies 100. In an embodiment, the plurality of lines branched from the first supply line L1 may be connected to each other such that the first fluid F1 is circulated.

The second sub-line L4 has one end arranged between the second filter 42 and the fourth check valve CV4 in the first supply line L1, and the other end arranged between the compressor 30 and the second valve 52 in the second supply line L2. The third valve 53 may be arranged in the second sub-line L4.

The fourth check valve CV4 is arranged on the first supply line L1 before a portion in which the first supply line L1 branches into the plurality of lines. The fourth check valve CV4 may direct the first fluid F1 having passed through the second filter 42 to move to the plurality of nozzle assemblies 100.

The third sub-line L5 is branched from the second supply line L2 and connected to the first supply line L1. One end of the third sub-line L5 is branched between the other end of the second sub-line L4 and the second valve 52, and the other end of the third sub-line L5 is connected to the plurality of lines branched from the first supply line L1 connected to each other. The fourth valve unit V4 may be arranged on the third sub-line L5, and may be opened in a cleaning operation.

The fourth sub-line L6 may be branched from the first supply line L1 and connected to the storage tank 10. One end of the fourth sub-line L6 is branched in front of the fourth check valve CV4, and the fifth valve unit V5 may be arranged on the fourth sub-line L6.

In a cleaning operation, the spray system 4 may discharge the first fluid F1 remaining in the spray system 4 by moving the second fluid F2 to the first supply line L1.

When the third valve 53 is opened and the second valve 52 is closed, the second fluid F2 moves along the second sub-line L4 to the first supply line L1. By the first check valve CV4, the second fluid F2 moves to the storage tank 10 through the second filter 42, the pump 20, and the first filter 41. At this time, the second fluid F2 may remove foreign substances remaining in the first filter 41 and the second filter 42.

When the fourth valve unit V4 is opened and the second valve 52 is closed, the second fluid F2 moves along the third sub-line L5 to the first supply line L1. The second fluid F2 introduced into the rear end of the first supply line L1 is discharged to the plurality of nozzle assemblies 100, and, by the fourth check valve CV4, is not moved to the storage tank 10. The second fluid F2 moving through the first supply line L1 may remove foreign substances in the first supply line L1, and remove the first fluid F1 remaining in the first supply line L1.

Figure 14:
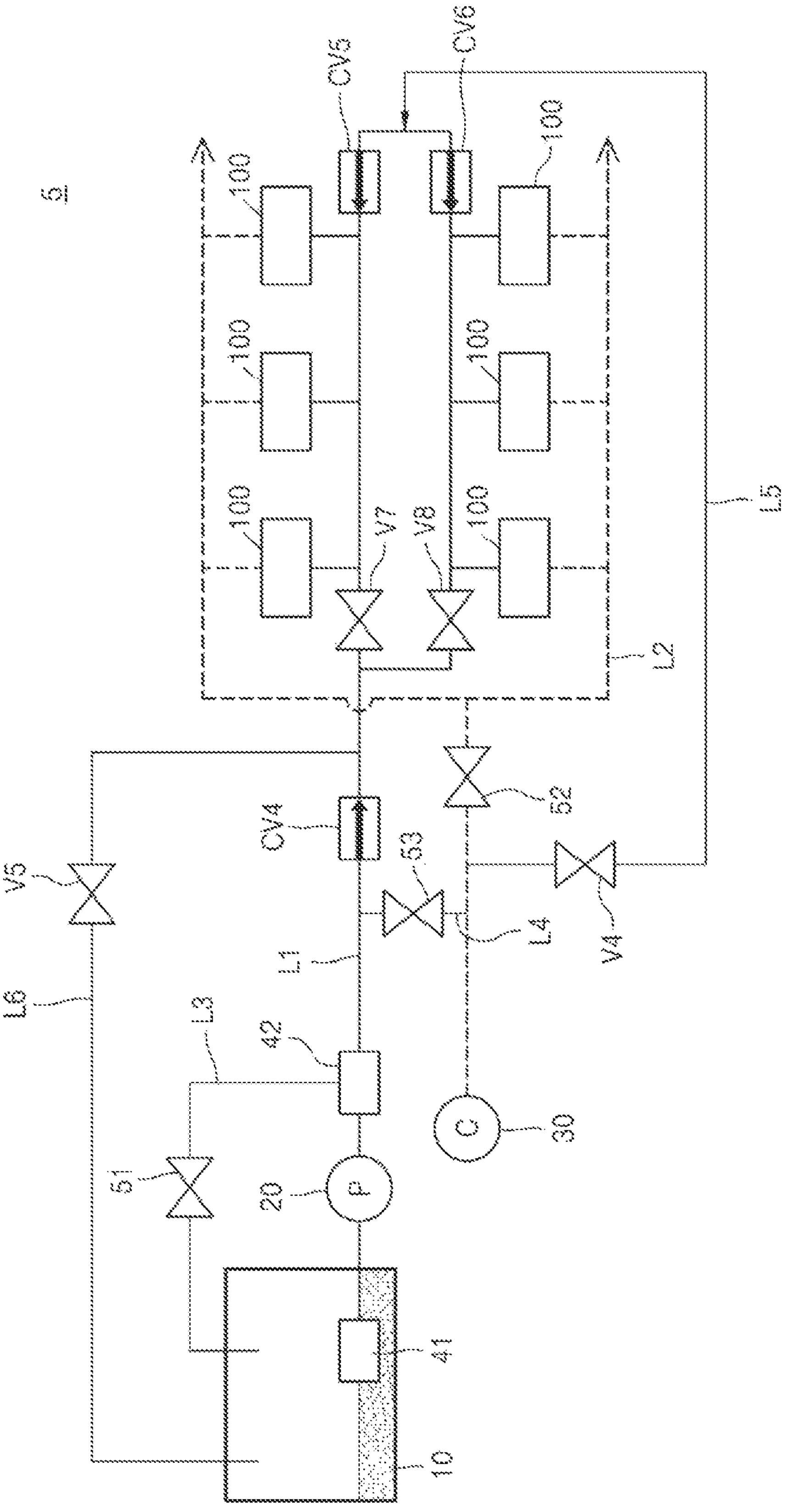

Referring to FIG. 14, a spray system 5 may have the storage tank 10, the pump 20, the compressor 30, the first filter 41, the second filter 42, a plurality of valves, the nozzle assembly 100, the first supply line L1, the second supply line L2, the first sub-line L3, the second sub-line L4, the third sub-line L5, the fourth sub-line L6, the fourth check valve CV4, a fifth check valve CV5, a sixth check valve CV6, the fourth valve unit V4, the fifth valve unit V5, a sixth valve unit V6, and a seventh valve unit V7.

In the spray system 5, a plurality of nozzle assemblies 100 may be arranged in parallel along the first supply line L1, and the seventh valve unit V7 and an eighth valve unit V8 may be arranged at each end. In an embodiment, the fifth check valve CV5 and the sixth check valve CV6 are arranged at each end.

In a cleaning operation, the spray system 5 may discharge the first fluid F1 remaining in the spray system 5 by moving the second fluid F2 to the first supply line L1.

When the third valve 53 is opened and the second valve 52 is closed, the second fluid F2 moves along the second sub-line L4 to the first supply line L1. By the first check valve CV4, the second fluid F2 moves to the storage tank 10 through the second filter 42, the pump 20, and the first filter 41. At this time, the second fluid F2 may remove foreign substances remaining in the first filter 41 and the second filter 42.

When the fourth valve unit V4 is opened and the second valve 52 is closed, the second fluid F2 moves along the third sub-line L5 to the first supply line L1. Thereafter, the second fluid F2 may pass through the fifth check valve CV5 and the sixth check valve CV6 to clean the plurality of nozzle assemblies 100. In an embodiment, the nozzle assembly 100 may be cleaned for each line by adjusting the opening degrees of the seventh valve unit V7 and the eighth valve unit V8.

The spray system 5 may control, independently for each line, the nozzle assemblies 100 arranged in a plurality of lines, and clean the nozzle assemblies 100 for each line.

Figure 15:
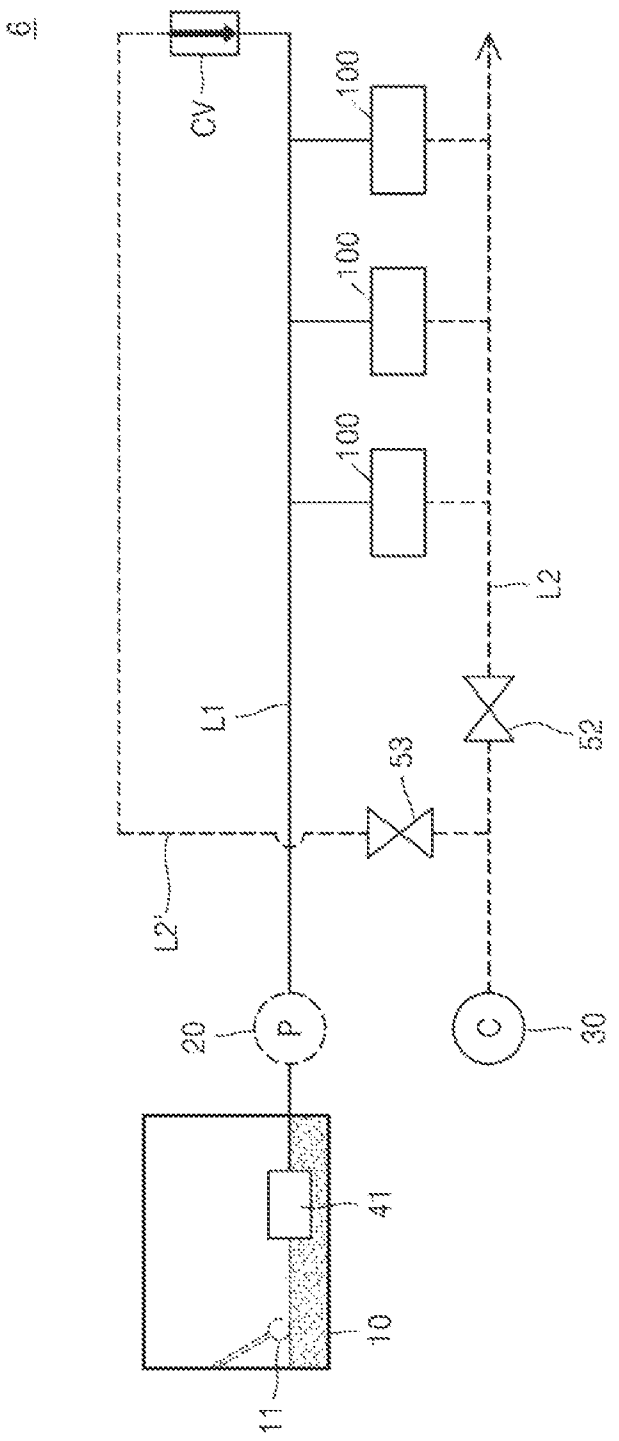
FIG. 15 is a diagram illustrating a spray system according to another embodiment of the present disclosure.

FIG. 15 is a diagram illustrating a spray system 6 according to another embodiment of the present disclosure.

Referring to FIG. 15, the spray system 6 may include the storage tank 10, the compressor 30, the first filter 41, the second valve 52, the third valve 53, the nozzle assembly 100, and a check valve CV. In another embodiment, the check valve CV may be optionally provided.

The spray system 6 stores the first fluid F1 in the storage tank 10, and by driving the compressor 30, the first fluid F1 automatically moves along the first supply line L1, and is then sprayed. Even in a case in which the spray system 6 does not include a separate additional supply device such as a pump, when the second fluid F2 is sprayed from the nozzle assembly 100 by the compressor 30, the first fluid F1 may move along the first supply line L1. In FIG. 15, the pump 20 is optionally provided, and thus, the overall volume of the spray system 6 may be minimized and downsized.

In a spray operation, the compressor 30 is driven in a state in which the third valve 53 is closed and the second valve 52 is opened. The high-pressure second fluid F2 moves along the second supply line L2 and is then sprayed from the nozzle assembly 100. When the second fluid F2 is sprayed, the first fluid F1 stored in the storage tank 10 is moved in a self-priming manner. In detail, because the pressure at the outlet of the nozzle assembly 100 decreases when the second fluid F2 is sprayed at a high pressure, the first fluid F1 moves from the storage tank 10 to the nozzle assembly 100 along the first supply line L1. That is, the spray system 6 may spray the first fluid F1 without additional driving to move the first fluid F1.

In a cleaning operation, the compressor 30 is driven in a case in which the second valve 52 is closed or opened and the third valve 53 is opened. The high-pressure second fluid F2 moves along a second supply line L2' and moves to the rear end of the first supply line L1.

The check valve CV may be arranged between the first supply line L1 and the second supply line L2', to set the flow direction of the second fluid F2. The second fluid F2 having moved to the first supply line L1 may clean the nozzle assembly 100 and the first filter 41. In an embodiment, the first fluid F1 remaining in the first supply line L1 may be recovered to the storage tank. In an embodiment, the check valve CV may optionally be provided in the spray system 6. For example, when the first supply line L1 or the second supply line L2 is long, the check valve CV may be installed, and otherwise, the check valve CV may be omitted.

The spray system 6 may optionally include a flow measurement unit 11 configured to measure the flow rate of the first fluid F1 stored in the storage tank 10. The flow measurement unit 11 may include a water level control ball to measure the flow rate of the first fluid F1 stored in the storage tank 10. When the flow rate of the storage tank 10 is low, the first fluid F1 may be additionally supplied to maintain a constant water level. The flow measurement unit 11 may also be applied to the spray systems 1, 2, 3, 4, and described above.

The spray system 6 may optionally include the pump 20. When it is necessary to spray the first fluid F1 at a high pressure, the pump 20 may be additionally installed in the spray system 6. The pump 20 may also be selectively provided in the spray systems 1, 2, 3, 4, and 5 described above. Even in the spray systems 1, 2, 3, 4, and 5 described above, the second fluid F2 may be sprayed by using the compressor 30 such that the first fluid F1 is sprayed in a self-priming manner.

A nozzle assembly and a spray system according to the present disclosure may atomize a fluid to be sprayed, into significantly small particles. When different fluids are introduced into the nozzle assembly and a first fluid is sprayed, a second fluid having a swirling force may collide with the first fluid to break apart the first fluid. In an embodiment, the second fluid having a swirling force guides the movement of the first fluid, such that the first fluid is sprayed over a wide area.

The nozzle assembly and the spray system according to the present disclosure may remove foreign substances therein. When the end of the nozzle assembly is blocked, the flow direction of the second fluid is changed, and thus, the second fluid moves in a direction opposite to the moving direction of the first fluid. The second fluid may remove foreign substances in the nozzle assembly and the spray system through a filter.

The nozzle assembly and the spray system according to the present disclosure may clean the inside thereof by changing the flow of the second fluid. By moving the second fluid to the first supply line through which the first fluid is supplied, the inside of the spray system may be cleaned.

Although the present disclosure has been described with reference to the embodiments illustrated in the drawings, they are merely exemplary, and it will be understood by one of skill in the art that various modifications and equivalent embodiments may be made therefrom. Therefore, the true technical protection scope of the present disclosure should be determined by the appended claims.

INDUSTRIAL APPLICABILITY

A nozzle assembly and a spray system including the same according to an embodiment of the present disclosure may be applied to various industrially available devices capable of spraying a fluid.

The invention claimed is:

1. A nozzle assembly comprising:
- a base body having one end comprising an outlet through which a first fluid and a second fluid are discharged, and another end connected to a first supply line, one side of the base body being connected to a second supply line; and
- an inserter that is inserted into the base body, and has a plurality of guide grooves arranged on a surface thereof,
- wherein, in the base body, a first pressure of the first fluid supplied through the first supply line is less than a second pressure of the second fluid supplied through the second supply line,
- wherein, in the inserter, the first fluid moves to the outlet through an internal space, and the second fluid moves to the outlet along the plurality of guide grooves,
- wherein, in the outlet, the first fluid is introduced through a first opening, and both the first fluid and the second fluid are discharged together through a second opening,
- wherein the inserter has the first opening through which the first fluid flows in an axial direction and is discharged into the outlet,
- wherein each of the plurality of guide grooves has a respective outlet-connecting end through which the second fluid flows and is discharged into the outlet, and
- wherein a cross-sectional area of the first opening at a portion thereof that opens into the outlet is less than a sum of cross-sectional areas of outlet-connecting ends of the plurality of guide grooves that open into the outlet, and greater than a cross-sectional area of one of the outlet-connecting ends of the plurality of guide grooves that open into the outlet.

2. The nozzle assembly of claim 1, wherein, while the second fluid is discharged from the outlet, a flow of the first fluid increases.

3. The nozzle assembly of claim 1, wherein the inserter comprises:
- a head part having the plurality of guide grooves arranged on the surface thereof;
- a shaft connected to the head part; and
- a flange connected to the shaft and extending in a radial direction thereof.

4. The nozzle assembly of claim 3, wherein the plurality of guide grooves are arranged to be spaced apart from each other along an inclined surface of the head part, and
- wherein extension lines of the plurality of guide grooves are arranged to be offset from each other.

5. The nozzle assembly of claim 3, wherein the plurality of guide grooves are arranged on an inclined surface of the head part and tilted at a preset inclination, to form a swirl in the second fluid.

6. The nozzle assembly of claim 1, wherein the plurality of guide grooves respectively have an inlet end through which the second fluid is introduced, and an outlet end through which the second fluid is discharged, and
- wherein a cross-sectional area of the inlet end is greater than a cross-sectional area of the outlet end.

7. The nozzle assembly of claim 6, wherein a cross-sectional area of each of the plurality of guide grooves decreases from the inlet end to the outlet end.

8. A spray system comprising:
- a storage tank in which a first fluid is stored;
- a first supply line connected to the storage tank;
- a pump arranged on the first supply line;
- a nozzle assembly connected to the first supply line;
- a second supply line that is connected to one side of the nozzle assembly and supplies a second fluid to the nozzle assembly; and
- a compressor arranged on the second supply line,
- wherein a first pressure of the first fluid supplied through the first supply line is less than a second pressure of the second fluid supplied through the second supply line,
- wherein the nozzle assembly comprises:
  - a base body connected to the first supply line and the second supply line and having an outlet through which the first fluid and the second fluid are discharged; and
  - an inserter that is inserted into the base body, and has a plurality of guide grooves arranged on a surface thereof,
- wherein, in the inserter, the first fluid moves to the outlet through an internal space, and the second fluid moves to the outlet along the plurality of guide grooves, wherein, in the outlet, the first fluid is introduced through a first opening, and both the first fluid and the second fluid are discharged together through a second opening, wherein the inserter has the first opening through which the first fluid flows in an axial direction and is discharged into the outlet, wherein each of the plurality of guide grooves has a respective outlet-connecting end through which the second fluid flows and is discharged into the outlet, and wherein a cross-sectional area of the first opening at a portion thereof that opens into the outlet is less than a sum of cross-sectional areas of outlet-connecting ends of the plurality of guide grooves that open into the outlet, and greater than a cross-sectional area of one of the outlet-connecting ends of the plurality of guide grooves that open into the outlet.

9. The spray system of claim 8, wherein the pump is driven after the compressor is driven such that the second fluid is sprayed from the nozzle assembly and the first fluid is introduced into the pump from the storage tank.

* * * * *